May 8, 1934.  G. E. STANLEY  1,958,319

PLATE CLUTCH

Filed Nov. 28, 1933

Inventor:
George Enoch Stanley,
By Mawhinney & Mawhinney,
Attys.

Patented May 8, 1934

1,958,319

UNITED STATES PATENT OFFICE 1,958,319

PLATE CLUTCH

George Enoch Stanley, Coventry, England, assignor to Small & Parkes Limited, Manchester, England Application November 28, 1933, Serial No. 700,127
In Great Britain October 28, 1932

8 Claims. (Cl. 192—107)

This invention relates to plate clutches such as are fitted with friction annuli which take up the engagement. It has for its main object to provide an improved construction whereby a very smooth operation of the clutch can be obtained. A further object is to arrange that wear of the friction annuli should be substantially equalized.

According to the invention, an annulus of friction material, for use in a plate clutch, has one or more slots extending from its inner periphery and it is biased in the vicinity of its inner periphery out of its plane in a clutch-engaging direction. Thus, when the clutch is being engaged the inner periphery of the friction annulus will be the first to contact with the co-operating surface, whereby a smooth take up is ensured. This would tend to cause greater wear of the inner periphery of the friction annulus than of the outer periphery; but, on the other hand, when the clutch slips the greater speed of the outer periphery tends to cause greater wear of the outer periphery. Consequently, by means of the invention the wear of the friction annulus is substantially equalized. Preferably the friction annuli are arranged on opposite sides of the driven clutch plate, which may be as described in the specification of U. S. A. Patent No. 1,927,995.

In the accompanying drawing:—

Figure 1:
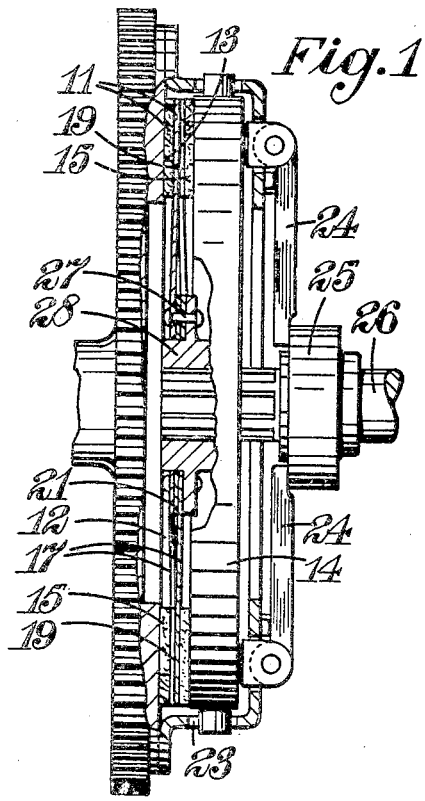
Figure 1 is a part-sectional side elevation of one form of plate clutch according to the invention.
Figure 2:
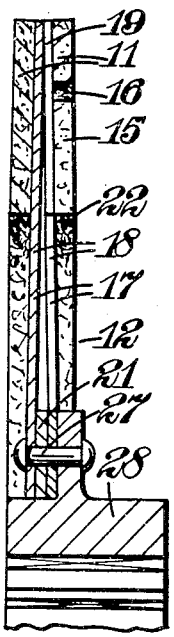
Figure 2 is a fragmentary sectional view, to a somewhat larger scale, of the clutch plate when freed.
Figure 3:
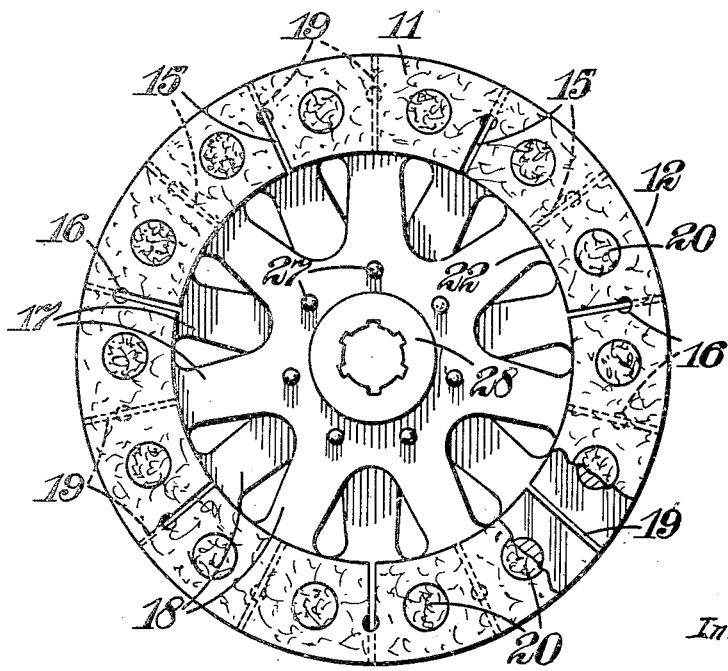
Figure 3 is an end elevation of the clutch plate.

As shown in the accompanying drawing, the friction annulus 11 (which may be of any form of impregnated fabric or other non-metallic material) is carried by the driven clutch plate 12 for the best results to be obtained, this latter preferably having similar friction annuli 11, 11 arranged one on each side to co-operate with the driving face 13 and the presser-plate 14 of the clutch. The presser-plate has at 23 a sliding and driving connection with the driving face 13 and is withdrawn against the usual clutch-engaging springs, not shown, by the actuating levers 24 engaged by the withdrawal collar 25 on the driven clutch shaft 26.

The slots 15, 15, 15 in a friction annulus are preferably radial ones extending from the inner periphery for about two-thirds of the width of the annulus where they would terminate at drilled holes or with rounded ends 16, 16 so that the likelihood of the slot spreading towards the outer periphery would be obviated. In practice there would usually be a number of these slots in each annulus angularly spaced by equal amounts.

Any provision may be made for biasing the annulus in the neighbourhood of its inner periphery in the clutch-engaging direction. For example, it is known in other clutches, when the annulus is mounted on the driven clutch plate, for the latter to have a tongue of metal which is outwardly sprung to engage the annulus and bias it as desired.

In a preferred arrangement, as here illustrated, the clutch plate is formed of two metal laminations 17, 17 each having a peripheral rim which is joined to the centre by spokes 18, 18 and which is divided into arcuate portions by small clearances 19, 19, and friction annuli are conveniently mounted upon opposite sides of the metal laminations by means of cork rivets 20, 20, thus serving to unite the peripheries of the metal laminations to one another. In this case the partial slots 15, 15 in the friction annuli would preferably be arranged to be in alignment with the clearances 19 in the adjacent metal lamination. Thus, if the laminations each have seven spokes, say, and seven arcuate portions, these latter on one lamination being staggered with respect to those of the other, each friction annulus would have seven partial slots 15, 15, as shown, and when the clutch plate is assembled the slots 15 of one annulus would be angularly displaced with respect to those of the other. The rivets would preferably be arranged centrally of each adjacent pair of clearances, so that the partial slots in the annuli would be away from the rivets.

In this latter arrangement a simple method of introducing the necessary bias involves spacing the two laminations from one another at the centre by means of a washer 21, this being secured by the rivets 27 attaching the laminations to the hub 28.

By means of the invention, the inner periphery 22 of the friction annuli will be the first to make contact when the clutch is being engaged and this results in a very smooth operation of the clutch whilst tending to equalize wear over the surface of the friction annuli.

What I claim as my invention and desire to secure by Letters Patent of the United States is:—

1. In a plate clutch, an annulus of friction material, a co-operating friction surface, said annulus having a slot extending from its inner periphery and terminating inwardly of its outer periphery, and means biasing said inner periphery out of the plane of said annulus towards said co-operating surface.

2. In a plate clutch, an annulus of friction material, a co-operating friction surface, said annulus having a plurality of symmetrically-arranged slots extending from its inner periphery and terminating inwardly of its outer periphery, and means biasing said inner periphery out of the plane of said annulus in a clutch-engaging direction.

3. In combination, a flexible clutch plate, an annulus of friction material carried thereby, said annulus having a plurality of radial slots extending from its inner periphery not fully across said annulus, and means biasing said inner periphery outwardly.

4. In combination, a clutch plate built up of flexible metal laminations, means spacing said laminations from one another at the centre, means inwardly of the outer peripheries of the laminations for holding the outer peripheral portions of the laminations in contacting relation, and friction annuli attached on opposite sides of said clutch plate, said annuli being provided with slots extending from their inner peripheries and terminating inwardly of their outer peripheries.

5. In a flexible clutch plate, a metal spider lamination with its periphery divided by slots into arcuate portions to which the spokes connect, and a friction annulus secured to said metal lamination, said friction annulus being formed with slots which extend from the inner periphery of said friction annulus and terminate inwardly of the outer periphery, said slots being aligned with those of said metal lamination.

6. A flexible clutch plate built up of metal spider laminations, means spacing said laminations from one another at the centre, means inwardly of the outer peripheries of said laminations for holding the outer peripheral portions of said laminations in contacting relation, and friction annuli attached to opposite sides of said clutch plate at said peripheries, said annuli being provided with slots arranged substantially midway between the spokes of the adjacent lamination and extending from the inner periphery of the annulus about two-thirds of the way across.

7. A clutch plate, according to claim 4, where the slots of one anulus are staggered with respect to those of the other.

8. A clutch plate comprising a hub, two flexible metal laminations secured thereto, spacing means interposed between said laminations at their inner peripheries, and friction annuli engaging against the outer surfaces of said laminations adjacent their outer peripheries, and means for securing said annuli to the laminations, said means also serving for holding the outer peripheries of the laminations to one another, thus dishing said laminations towards one another, said annuli having partial slots in them extending radially from their inner peripheries and terminating inwardly of their outer peripheries.

GEORGE ENOCH STANLEY.